June 30, 1959  R. LEE  2,892,498
WINDOW SCREEN
Filed March 7, 1957

INVENTOR
Richard Lee
BY
HIS ATTORNEY

United States Patent Office 2,892,498
Patented June 30, 1959

2,892,498

WINDOW SCREEN

Richard Lee, Buffalo, N.Y.

Application March 7, 1957, Serial No. 644,619

1 Claim. (Cl. 160—369)

My invention, relating generally to the problem of window protection, more particularly concerns novel screening for windows of automobile vehicles and generally like structures. As well, it concerns a novel method of conforming such screens to the structure undergoing protection.

One object of my invention is to provide a protective screen of the general type described which lends itself readily to various methods of manufacture and which can be easily and inexpensively produced and sold at low retail pricing.

Another object is to produce an automobile screen which, either of single basic dimensions or at the most, two or three basic forms, can readily be purchaser-cut to precise dimensions required for the particular vehicle without demand for special tools, and which requires no extraneous or auxiliary parts or equipment while initially installing it or thereatfer retaining it in position n the automobile or the like, and which may be readily stacked for storage when not in use.

Yet another object is to provide, in simple and direct manner, a vehicle screen which, readily installed, will thereafter remain firmly in place in the almost total absence of likelihood of loss therefrom, and which conforms readily to the vehicle in which it is installed, all in the substantial absence of stresses and strains either in installation or in subsequent use; in which the elements thereof may be readily deformed momentarily in various directions to permit initial installation without acquiring a permanent set; and in which the said elements are resistant to weathering and are essentially non-corrosive.

Another object is to provide a window screen of the general type described which in substantial measure reduces tendency of rain, incident upon the frame of the screen, from dripping onto and through the screen itself, at the same time facilitating the application to the screen, in readily removable manner, of an interlocking sun visor.

Other objects and advantages in part will be obvious and in part pointed out hereinafter during the course of the following description, an understanding which will be facilitated when considered in the light of the accompanying drawings.

Accordingly, my invention may be considered to reside in the combination of elements, features of construction and arrangement of parts, and in the various procedural and manipulative steps in the fabrication and utilization of the same, the scope of the application of all which is more fully set forth in the claim at the end of this specification.

Figure 1:
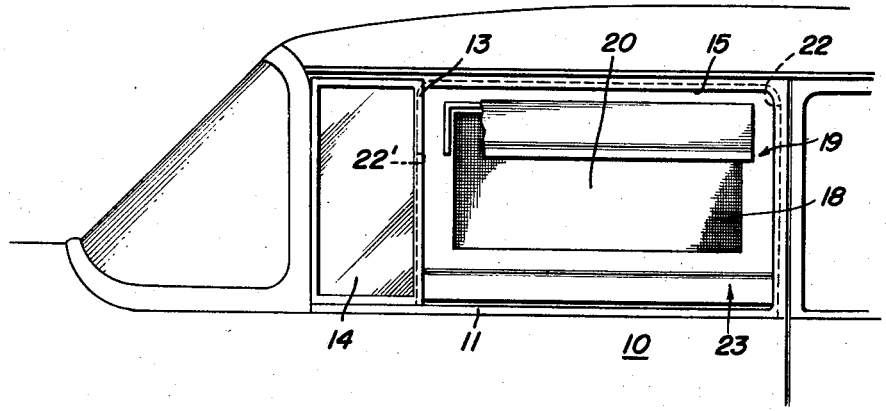
Figure 2:
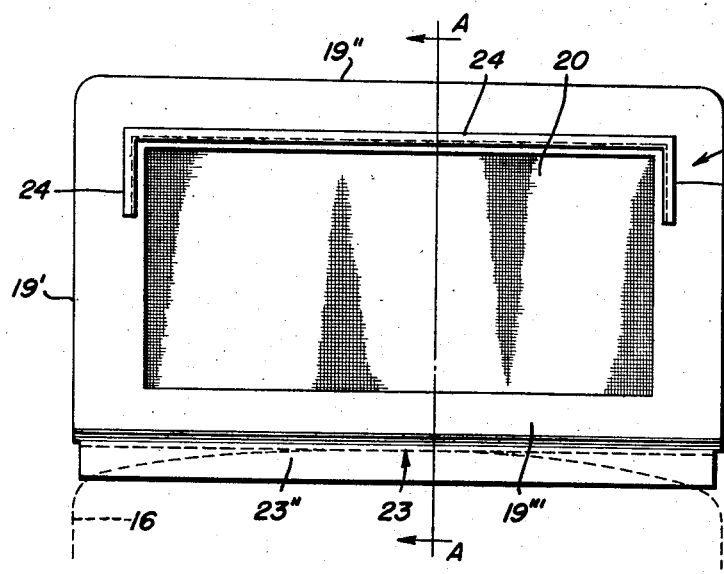
Figure 3:
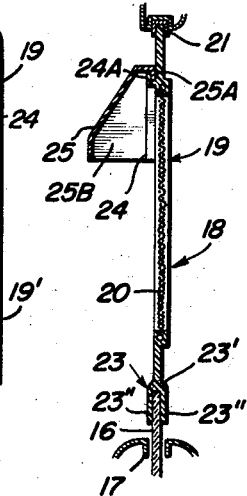

In the several views of the accompanying drawing, wherein I have set forth that embodiment of my invention which I prefer at present:

Fig. 1 is a partial side elevation, showing a screen according to my invention as employed in an automobile which is disclosed with parts broken away for simplicity of disclosure;

Fig. 2 discloses, in side elevation, the window screen as initially dimensioned, before the frame thereof is fitted to the window of the automobile, this view additionally disclosing a rain gutter flange provided on the frame of the screen; while Fig. 3 is a sectional view taken on the line A—A of Fig. 2 disclosing the window screen with final dimensions imparted thereto as mounted in a particular car window, Fig. 3 disclosing a removable sun visor applied in interlocking engagement with the rain gutter flange of the screen frame and supported by this flange and also disclosing the manner in which my new screen engages with and is held by the corresponding parts of the window of the automobile.

Throughout the several views of the drawings like reference charatcers denote like structural parts.

To permit a more ready and thorough understanding of my invention it may be noted at this point in the disclosure that there are frequently encountered instances in which, in the window of an automotive vehicle, be the same passenger car, truck, bus, power boat, ship or the like, it is desired to provide screening which, readily applied when required, can be removed with equal facility when the need therefor no longer exists.

My new screen has particular utility at times when the instrumentality on which the screen is installed is at rest. Typical instances illustrating this comprise automobiles standing in parks, roadside tables, drive-in theaters, vehicles adapted for sleeping purposes, and the like. It has further utility, however, where screened ventilation is desired during motion. This avoids the unpleasant incidence and even harzard, of debris or insects otherwise winging into the car, among which may be included flies, mosquitoes, stinging insects, paper scraps and the like.

The problems just recited have received much attention in the art and many proposals have been suggested in attempt to solve them. Some of these proposals have proved successful, at least in part. But there remains unsatisfied and significantly unsolved the provision of a window screen which combines flexibility sufficient for ready application, with reinforcement molded or otherwise applied thereto and imparting essential sturdiness to the product. In short, no one has heretofore provided a reinforcement of the type described, which reinforcement serves as a rain gutter and as the interlocking retaining bracket for a removable sun visor.

Accordingly, an important object of my invention is to provide an automobile window screen of the general type described which combines requisite flexibility for ready installation while possessing sufficient reinforcement to impart sturdy characteristics to the screen and in which the reinforcement serves as a rain guttering which protects the screen itself and also serves as an interlocking and readily disengageable abutment for a removable sun visor mounted therein.

Reference is now had more particularly to the disclosure of the several views of the drawings. Therein I schematically indicate an automobile at 10 in Fig. 1, in the window 11 of which I mount the screen according to my invention. While the screen is shown as installed in the window of a passenger automobile, it is to be understood that by no means am I limited to this field of utilization. For similarly the screen may be mounted in the window of a commercial or industrial vehicle such as a delivery van, an automobile tractor or the like. Similarly, it may be mounted in a diesel locomotive, in a power boat or in a generally similar installation.

In the car window indicated generally at 11, the opening 12 ordinarily is divided by vertical leg 13 into two window sections. There need be no concern with the forward section 14, attention here being directed to the rearward area 15. In area 15 I reciprocably mount a window glass 16 for movement up and down through a generally vertical plane. This window glass 16 runs between the margins of the automobile door or the like indicated at 17 in Figs. 1 and 3.

Giving attention to the new screen itself, this screen is indicated generally at 18 in Fig. 1. It comprises a frame 19 and screening 20. The frame 19 preferably is formed of a plastic, polyethylene having proved entirely satisfactory for this purpose. It combines the advantageous characteristics of light weight and attractive appearance. For all practical purposes, it is unbreakable. It is completely rustproof. Because of its light weight and rustproof qualities, coupled with narrow width in cross section as hereinafter described in greater particularity my new screen lends itself readily to storage when not in use. Two or more such screens, each of which lies neatly flat, can be nested on top of each other, in small compass.

Because of the intermittent use of such screens it is also advantageously important that the production costs be kept at the lowest possible minimum. This will permit marketing at attractive and competitive pricing. Manufacture must be rapid and with minimum of labor, possessing no particular skills.

I find that if properly chosen plastics are employed, with curing technique and time schedules properly chosen, manufacture is rapid and inexpensive. Contributing to this, I find it to be highly desirable to take advantage of the characteristics of this comparatively thin gauge plastic by producing a plastic frame, preferably of but a single set of exterior dimensions and essentially rectangular in configuration. Or at the most, frames of but two or three different sets of exterior dimensions may be produced.

I then cut the frame to desired shape simply by applying a template to the surface of the frame and cutting about this template. The template will have the shape of the particular window frame to which it is to be applied. It will be slightly greater in dimensions than the window opening itself. This will permit the finished screen to be snapped to removably locked engagement in the window frame. I prefer to form this template of paper, cardboard, or the like, so that it will be of low first cost and may be destroyed after use without material waste or loss. Scissors, shears, a knife or other cutting instrument may be employed to cut the window frame to the design of the template. The small thickness of the screen frame contributes to this ready cutting. A novel reinforcement which I will describe at a later point herein contributes to the strength of the screen while in use. The flexibility inherent in the comparatively thin frame facilitates this ready application to the car window.

It is further to be understood from the foregoing that the screen will be produced in its universal form and sold at retail in this condition. The purchaser will apply the template thereto and cut the screen to his particular needs. Thus, he is enabled to obtain his screen at a reduced cost.

The screening 20 may be applied to the frame 19 at any suitable moment in the production. For example, if metal screening is employed it may be applied following separate manufacture of the frame, as by U-shaped staples, heavy tacks or the like. Preferably, however, I use plastic screening which is molded in the frame 19 during manufacture. The added flexibility of this screening 20 contributes to the ease in which, as desired, the screen itself may be installed and removed from the car window. Thus the screen may be readily used over and over again. Moreover, such plastic screening is rustproof and comparatively unbreakable. It can be conformed through comparatively severe flexure during installation without taking a set. Where tearing or fracture may quickly develop where metal screens are used all tendency towards detrimental stress and strain is avoided through the use of plastic screening. Such screening is weather-resistant. It does not stain, whether in use or storage. Moreover, it is lighter in weight than metal screening.

Once the frame 19 is cut to size, it is ready to apply to the car window. The frame 19, now nicely tailored and contoured to the particular window, is snapped into the glass runs with which the car window is provided on its top horizontal extent and on the vertical sides of the window frame. A top glass run is disclosed at 21 in Fig. 3 while the side runs are indicated by dotted lines at 22 and 22', respectively, in Fig. 1.

To install the screen, the window 16 is lowered in the door frame 17 (Fig. 3). The screen frame 19 is bent or arched slightly so that the lateral sides 19', 19' of this screen frame 19 may be inserted in the side glass runs of the window frame. When the screen is released, the natural resiliency thereof is such that it will spring into flattened position, locked in the side runs; and the top portion 19" of the screen frame 19 will slide easily into locking engagement in the top glass run 21 of the window frame.

I rely on the top end of the window glass 16 to hold my new screen firmly locked in operable position within the window frame of the car. And I also rely upon the engagement between window glass and screen frame against undesirable and unprotected openings between these two elements. Accordingly, and to achieve this, I mold a bottom channel 23 (Figs. 2 and 3) at the bottom extremity of the screen frame 19. To those skilled in the art it is but a simple matter to provide a molding core which will permit the production of this channel bottom. The channeled bottom, however, as best shown in Fig. 3, comprises a top yoke 23' of narrow width just sufficient to span the width of the glass window 16. Since the window tapers on some makes of cars downwardly from a highest central point to highest lateral points therebelow, I find it desirable to seal effectively against unprotected openings and to provide sufficient lateral bearing surfaces between screen frame and glass, to impart a depth to the leg portion 23" of the channel bottom 23 of approximately two inches.

At an earlier point herein I have explained the need for imparting flexibility to the screen itself. Not only does this permit reduction in total material expense and cost of production but more importantly, it permits removable insertion of the screen in the car window in which it is used.

In use, however, it is highly desirable to impart added strength to the screen frame, to protect against all tendency to yield or collapse. This prevents the screen from dropping out of the car window. It is a matter of particular importance when the car is in motion. To this end I provide on the frame 19 a reinforcement indicated generally at 24 (Fig. 2). This reinforcement may be applied in any suitable manner as by screws or other means. And it may be made of any suitable material. Preferably I mold this reinforcement at the time of manufacture, using the same material from which I form the screen frame itself. While the reinforcement may be provided on the face of the screen which is disposed inwardly in use I prefer, for reasons which I will discuss at a later point herein, to provide this reinforcement on that side of the screen frame which is arranged exteriorly in use. It is also possible for this reinforcement to be provided at any desired point on the surface of the screen frame, and that it extend in any desired direction. I prefer, however, that it stretch across the width of the frame shortly above, but in spaced relation to, the screen 20. One reason for providing this reinforcement 24 on the outer surface of the screen frame 19 is to permit it to serve as a rain gutter, effectively shielding the screen 20 from rain coursing down across the top framing portion 19" (Fig. 2). To this end I impart a channeled cross-sectional configuration to the reinforcement 24, as indicated at 24A in Fig. 3.

Thus channelized and provided on the exterior of the frame 19, the reinforcement 24 also serves as an anchoring abutment for a sun visor 25. This sun visor 25 removably interlocks with and is carried by the channel 24A through an inwardly and down-struck marginal flange 25A (Fig. 3). This flange, complementary to the channel 24A, is provided at the inner top edge of the sun visor 25, extending through at least the greater part of the major axis thereof. In periods of bright sunshine the visor may be quickly applied in locking relation simply by nesting the flange 25A in the channel 24A. Thus suspended, and with its mass thrusting inwardly against the side runs 19', 19' of the frame 19 through side panels 25B (Fig. 3), the sun visor is carried firmly against all tendency to jolt or jiggle off. And at the same time, it is a matter of but a moment to lift the sun visor upwardly and outwardly, off of and free from channel 24A, when it is desired to remove the sun visor.

The mode of applying my new screen is apparent from the foregoing description. The car window is first cranked down to its bottom-most position. This frees the glass runs 21, 22 and 22', ready to receive the screen frame. The screen frame, with framing of width nicely adapted to the car runs (it is customary to use a glass of standard thickness in automobile windows) is then arched or flexed slightly to snap it into the side glass runs 22 and 22'. The reinforcement 24 is so calculated as to permit this slight flexing. The screen then snaps readily into position and may be slid into glass runs 22 and 22' until it is nicely received in top glass runs 21. The window 16 (Figs. 2 and 3) is then cranked up out of the body portion 17 until it is received within the side wings 23", 23" of the yoke bottoms 23 of the screen frame 19. The length of the skirt yoke 23", 23" is such as to overlie completely the top part of the window glass 16. And this is so even though typically, a slight curvature is imparted to the top of the window glass 16. Thus applied, the screen completely seals the car interior against unscreened access or communication with the exterior.

Insects and debris of all kinds are excluded. Circulating air enters freely. The screen is of low cost and ready manufacture. It is sturdy and of longer useful life. It may be provided in one, or at the most two or three universal sizes or combinations, at low first cost thereof. It may be template-fitted to the particular car window and thereupon applied directly and quickly to that window. Both of these steps may be performed in simple manner without the necessity of special skills or tools. Objectionable rain is shielded against, both from the channelized reinforcement 24 and, should the rain be heavy, by the application of the sun visor 25. Normally, however, the sun visor is employed primarily to protect against the direct rays of the sun, being quickly applied and removed for that purpose. Non-corrosive, a factor contributing to the long useful life of the screen, it is of neat appearance. It can be effectively stored from season to season. Its low first cost permits frequent replacement should the owner not want to be bothered with carryover from one season to another.

All the foregoing as well as many other highly practical advantages attend the practice of my invention. Since many embodiments of my invention will occur to those skilled in the art to which the invention relates, it will be understood that all matter described herein, or shown in the accompanying drawing, is solely by way of illustration and not by way of limitation.

I claim as my invention:

A screen for windows of automobiles and the like wherein a window frame is provided with channels or runs for a window glass, said screen comprising a plastic frame of width slightly greater than the width of an opening in the frame so that it can be snapped into the glass runs therefor; window screening integrally formed with said frame; an open U-shaped channel integrally formed with the outer face of said frame about the upper and upper side portions only of said screening and projecting outwardly therefrom for strengthening said frame and serving both as a water run-off and as an interlocking abutment and support for a related and removable sun visor; and an open yoke-like channel member at the bottom of said frame, said channel member being of inverted U-section with skirts or legs of length sufficient to engage and entirely nest about the top of said window glass.

References Cited in the file of this patent
UNITED STATES PATENTS

| | | |
|---|---|---|
| 1,465,821 | Henderson | Aug. 21, 1923 |
| 1,758,158 | James | May 13, 1930 |
| 2,035,079 | Kress | Mar. 24, 1936 |
| 2,568,800 | Galla | Sept. 25, 1951 |
| 2,619,168 | Leverence | Nov. 25, 1952 |
| 2,704,121 | Maidhof et al. | Mar. 15, 1955 |